United States Patent [19]

Kepler

[11] Patent Number: 5,074,118
[45] Date of Patent: Dec. 24, 1991

[54] AIR TURBO-RAMJET ENGINE

[75] Inventor: Charles E. Kepler, Manchester, Conn.

[73] Assignee: United Technologies Corporation, Hartford, Conn.

[21] Appl. No.: 295,167

[22] Filed: Jan. 9, 1989

[51] Int. Cl.[5] .................................. F02K 3/00
[52] U.S. Cl. ...................... 60/224; 60/226.1; 60/226.3; 60/246; 60/262; 60/269
[58] Field of Search .................. 60/224, 226.1, 226.3, 60/246, 262, 269

[56] References Cited

U.S. PATENT DOCUMENTS

| 3,946,554 | 3/1976 | Neumann | 60/226.2 |
| 4,224,790 | 9/1980 | Chrutensen | 60/224 |
| 4,598,544 | 7/1986 | Williams | 60/226.2 |

Primary Examiner—Donald P. Walsh
Attorney, Agent, or Firm—Peter R. Ruzek

[57] ABSTRACT

A jet engine designed to power a supersonic airplane throughout a range of speeds from subsonic to high supersonic includes a housing which bounds an internal passage having in succession a fixed-area inlet section, a diverging passage section, a mixing section, a combustion section, and an outlet section. A fan rotor rotates in the inlet section and includes a plurality of rotor blade members. The housing includes a main body and at least one flap which is movable between one end position in which it externally bounds a portion of the diverging passage section and another end position in which it externally delimits a diverging discharge passage connecting the diverging passage section with the exterior of the housing. The cross-sectional area of the outlet section is adjustable. The rotor is driven in rotation by a fuel/oxygen powered turbine the outlet of which communicates with the mixing section, but the driving action of the turbine is discontinued at actual supersonic velocities exceeding a predetermined supersonic velocity. The pitch of at least one element of each of the rotor blade members is adjustable.

12 Claims, 11 Drawing Sheets

FIG.8     $A_c = 25 \text{ ft}^2, \phi = 1, \eta_b = 0.9$

AIR TURBO-RAMJET ENGINE

The invention disclosed herein was made in the performance of work under NASA Contract No. NAS3-24843, and is subject to the provision of Section 305 of the National Aeronautics and Space Act of 1958 as amended (42 USC 2457).

TECHNICAL FIELD

The present invention relates to jet engines in general, and more particularly to jet engines capable of powering a supersonic aircraft.

BACKGROUND ART

There are already known various constructions of jet engines, among them such capable of powering supersonic airplanes. Renewed interest in high-speed flight ahs revivied interest in advanced high-speed propulsion systems. Studies made by Franciscus, L. C. in *Supersonic Through-Flow Fan Engines for Supersonic Cruise Aircraft*, NASA TM-78889, 1978 and in *The Supersonic Through-flow Turbofan for High Mach Propulsion*, AIAA-87-2050 at AIAA/SAE/ASME Joint Propulsion Conference, June 1987; by Trucco, H. in *Study of Variable Cycle Engines Equipped With Supersonic Fans, Final Report*, (ATL TR 201 Advanced Technology Laboratories, Inc., NAS3-17559), NASA CR-134777, 1975; and by Tavares, T. S. in *A Supersonic Fan Equipped Variable Cycle Engine for a Mach 2.7 Supersonic Transport*, Final Report for NASA Grant NAG3-697, 1986 have indicated that substantial improvements can be obtained by using a fan that is capable of accepting supersonic flow. The engines investigated in these studies were turbofans in which the supersonic fan replaced the conventional fan, and a supersonic diffuser was located downstream of the fan to provide subsonic flow into the high-pressure compressor. The advantage of this engine is attributed to the improvement in the installed thrust specific fuel consumption and the reduced inlet and nacelle weight. However, this type of powerplant, like the conventional turbofan, is probably limited to flight speeds below approximately Mach 3.5.

There is current interest in cruising at flight speeds in the Mach 5-6 range. At these speeds, a ramjet is an attractive powerplant; however, it cannot take off and accelerate through the low supersonic speed regime. A light-weight engine is needed to accelerate to the cruise condition. Current proposals dealing with this problem involve the use of two types of jet engines, usually in an over/under arrangement, one of them being operated only at subsonic, transonic and low supersonic speeds and the other being a ramjet engine which is activated only at higher supersonic speeds. It will be appreciated that the use of such alternative separate engines each of which is being used to power the airplane only during a certain phase of the flight regime and is idle and thus constitutes excess weight during the respective remaining phase greatly increases the take-off gross weight of the airplane and thus either reduces the payload of the airplane or increases its fuel consumption, or both.

Accordingly, it is a general object of the present invention to avoid the disadvantages of the prior art.

More particularly, it is an obJect of the present invention to provide a jet engine for use on an airplane that is to be accelerated to and cruise at high supersonic speeds, which engine does not possess the disadvantages of the known engines of this kind.

Still another object of the present invention is to develop the jet engine of the type here under consideration in such a manner as to be able to power the supersonic airplane throughout its flight regime from subsonic to high supersonic speeds.

It is yet another obJect of the present invention to devise an engine of the above type the operation of which can be easily adapted to various flight conditions and particularly to velocities and amounts of the incoming air that enters the engine.

A concomitant object of the present invention is design the jet engine of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a jet engine which is to be used to power an aircraft throughout a range of speeds from subsonic to high supersonic. This jet engine includes means for bounding an internal passage centered on an axis and including, in succession as considered in the direction of axial flow of incoming air into and through the passage, a fixed-area air inlet section, a diverging passage section, a mixing section, a combustion section, and an outlet section; fan means situated in the air inlet section and including a rotor mounted in the bounding means for rotation about the axis and including a plurality of circumferentially spaced rotor blade members; means for selectively rotating the rotor about the axis with attendant impelling action of the rotor blade members on the air flowing therebetween; and means for selectively discharging air from the diverging passage section to the exterior of the bounding means when the amount of incoming air passing through the fixed-area inlet section exceeds that required in the combustion section.

The propulsion system of the present invention preferably includes an air turbo-rocket engine which is equipped with a supersonic flow-through fan. This engine uses a gas generator (rocket) to drive the turbine which powers the supersonic fan. The turbine drive is not limited by flight speed, and the supersonic fan is capable of operating in this speed range.

BRIEF DESCRIPTION OF THE DRAWING

The present invention will be described in more detail below with reference to the accompanying drawing in which.

BEST MODE FOR CARRYING OUT THE INVENTION

Figure 1:
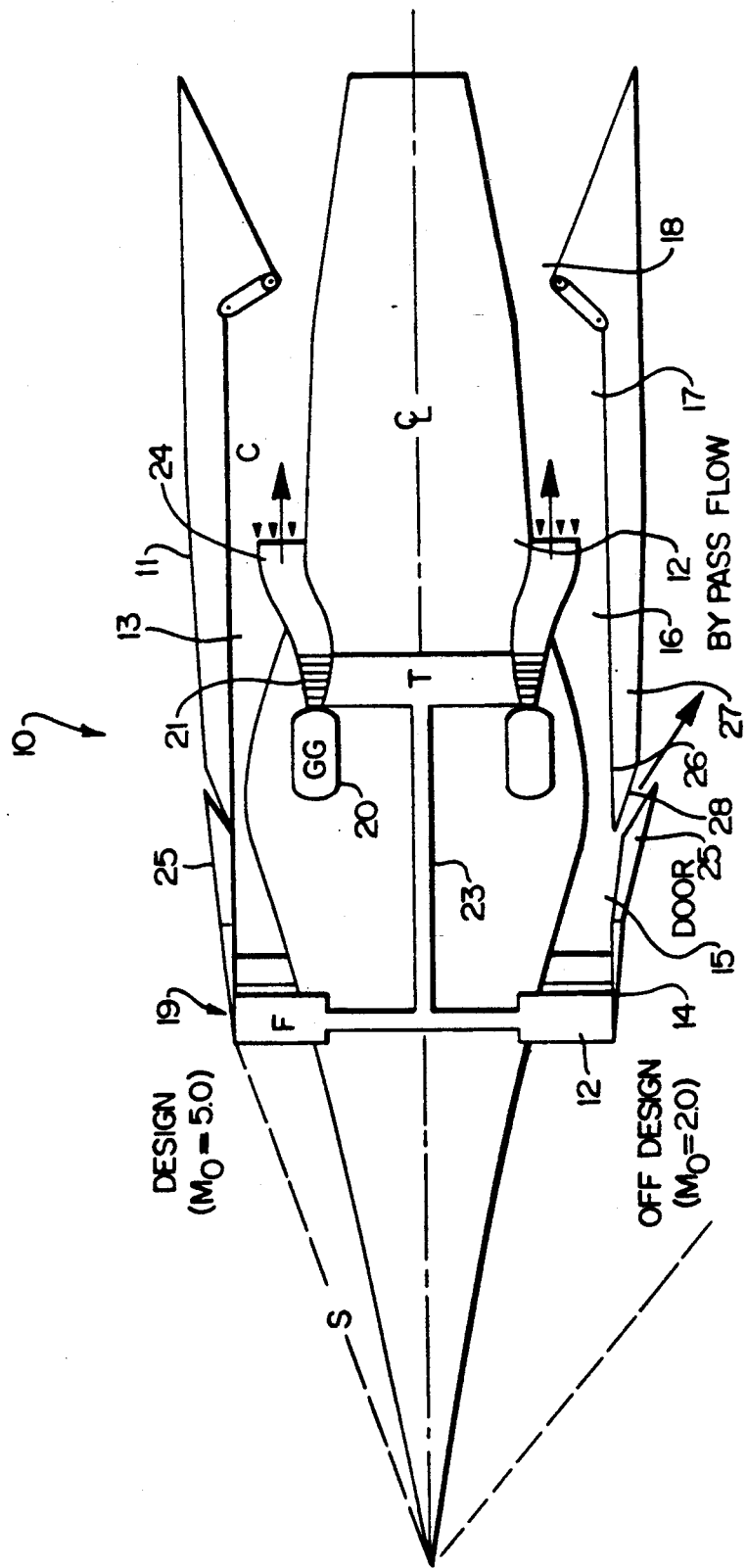
FIG. 1 is a simplified diagrammatic axial sectional view of a jet engine of the present invention.

Referring now to the drawing in detail, and first to FIG. 1 thereof, it may be seen that the reference numeral 10 has been used therein to identify a jet engine constructed in accordance with the present invention. The engine 10 includes a housing or cowling 11 which bounds, together with a centerbody 12, a passage 13. The passage 13 includes, in succession as considered in the direction of axial flow of the incoming air into and through the passage 13, an inlet section 14, a converging passage section 15, a mixing section 16, a combustion section 17, and an outlet section 18.

A supersonic through-flow fan 19 is mounted for rotation about a longitudinal axis of the passage 13. The fan 19 is like a shrouded propeller which can operate with supersonic flow coming into its blades. The flow remains supersonic as it passes through the blade row, and it emerges with a greater supersonic velocity due to the impelling action of the fan 19. Thus the flow is accelerated to a higher velocity and gains kinetic energy as it passes through the blade row. The total energy and the total pressure of the exiting flow increase relative to the incoming total energy and pressure. This increase in total pressure and total energy can be utilized to provide thrust in the jet engine flying at supersonic speeds.

For the application considered herein, the fan 19 is required to operate over a wide range of inflow velocities ranging from subsonic to the Mach 5 cruise condition. This requirement cannot be met with a fixed geometry fan configuration. Some type of variable-pitch arrangement is required to maintain a reasonable angle-of-attack as the inflow velocity is varied from 0 to 5. One type of such an arrangement is disclosed in a commonly owned U. S. patent application Ser. No. 07/295,168, filed simultaneously herewith and entitled "Variable Pitch Fan for High-Supersonic Aircraft", the entire contents of which is incorporated herein by reference. This fan construction solves, or at least reduces, the mechanical and aerodynamic problems associated with a variable-pitch fan, is a split-blade fan in which the rotor and stator blades are each composed of two blades which provide the same overall chord and camber as a single blade. This type of blading was assumed for the fan 19 used in the air-turbo-rocket engine 10 discussed below.

The supersonic fan engine 10 of this invention is a hydrogen-fueled air-turbo-rocket engine. It includes a gas generator 20 in which hydrogen is combusted with oxygen and the resulting combustion products then drive a multi-stage turbine 21 which, in turn, drives a rotor 22 of the fan 19 in rotation by means of a shaft 23. The gases leaving the turbine 21 through a turbine outlet 24 are mixed in the mixing section 16 of the passage 13 with the air flowing through the passage 13.

Performance requirements for subsonic combustion in the engine 10 were calculated for five flight conditions ranging from subsonic loiter speed to the Mach 5 flight condition. The results indicated a range of desired fan total pressure ratios at each flight speed. The desired range of fan total pressure ratios varies between 3–5 at subsonic speeds down to zero at the Mach 5 cruise condition. At cruise speed, a higher cruise fuel specific impulse is obtained by turning off the gas generator 20 and operating like a ramjet.

The engine 10 has a fixed conical inlet which was designed to have shock-on-lip, S, at Mach 5. The variable-pitch, split-blade, supersonic fan 19 is located inside the cowl lip. All the fan flow is decelerated in the convergent annular supersonic diffuser 15 situated downstream of the fan 19. The amount of compression can be controlled by adjusting the position of cowl doors or flaps 25 which carry at least a portion of the outer surface bounding the converging passage section 15 in the position of the flap 25 shown in the upper portion of the drawing. The fixed diffuser section or throat 15 is sized to accept all the fan flow at the Mach 5 condition. At lower flight speeds, such as the Mach 2 condition depicted in the lower half of the drawing, the doors or flaps 25 are slightly ajar so that they form with a corresponding portion 26 of a main body 27 of the housing 11 a discharge passage 28 for bypassing some of the flow. This bypass flow is reaccelerated in the discharge passage formed between the fixed structure 27 and the movable cowl door 25, due to the diverging configuration of this discharge passage 28. The main engine airflow is decelerated to subsonic velocities in the divergent throat and subsonic diffuser 15. The fuel rich hydrogen/oxygen gas-generator 20 supplies the correct amount of flow to drive the turbine 21 and provide the power necessary to drive the fan 19. The hydrogen rich turbine exhaust flow is mixed with the main airstream in the mixing section 16 and burned in the subsonic combustor section 17 of the passage 13. Additional hydrogen may be added at this point to make the overall flow stoichiometric. This flow is reaccelerated in the outlet section or throat 18 which forms a convergent-divergent exhaust nozzle. The nozzle exit area was 1.5 times the inlet capture area.

Figure 2:
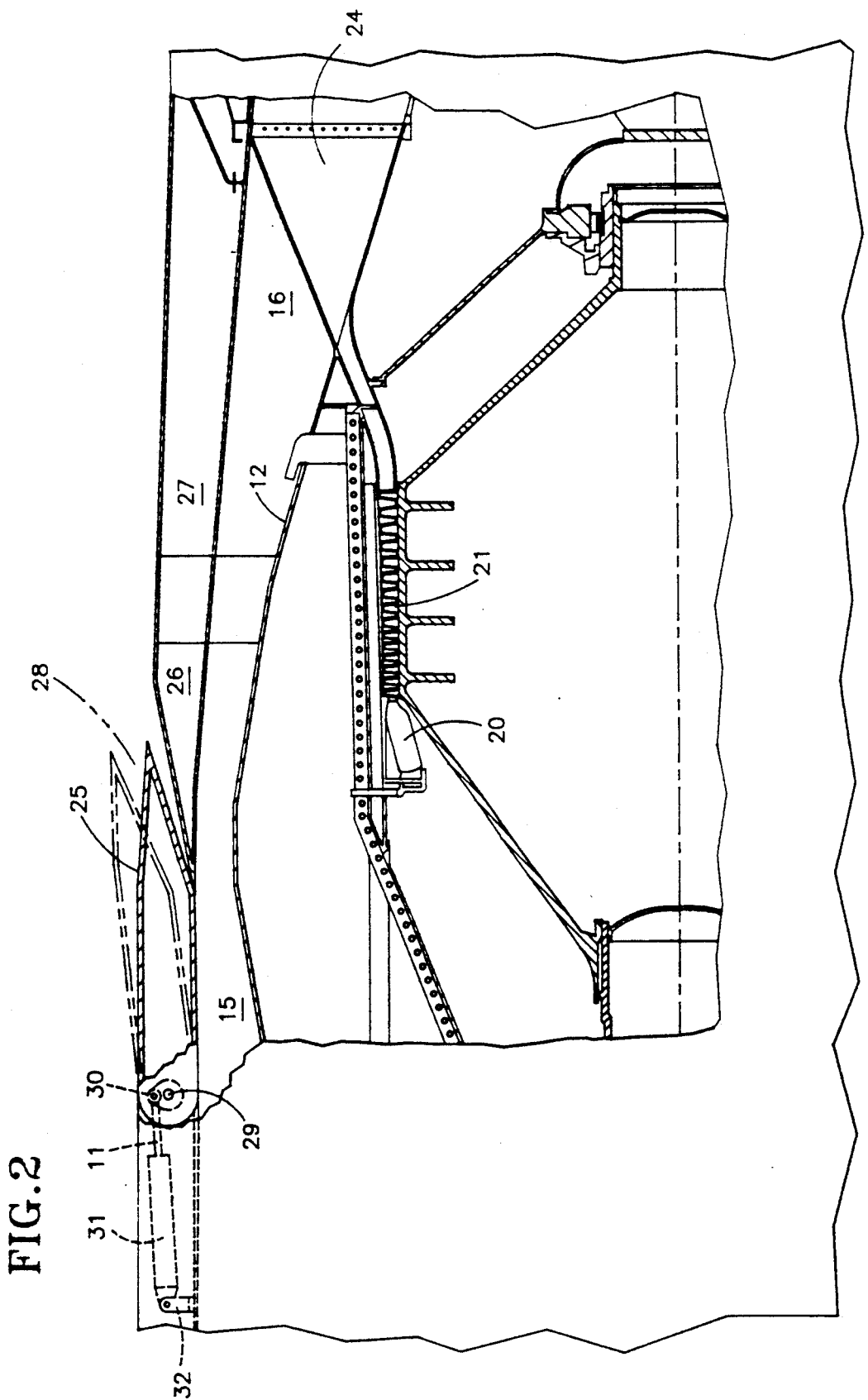
FIG. 2 is a view similar to that of FIG. 1 but showing only a fragment of the jet engine of the present invention in more detail than that presented in FIG. 1.

Further details of the cowl flap arrangement are shown in FIG. 2 of the drawing. It may be seen there that the cowl flap 25 is mounted on the housing 11 for pivoting about a pivot 29 jointly with a transmission element 30. A cylinder-an-piston unit 31 is interposed between the transmission element 30 and a support element 32 which is stationary relative to the housing 11 and is used for angularly displacing the flap 25, via the transmission element 30, into any desired angular position, such as those depicted in FIG. 2 in solid lines (no bypass flow) and in broken lines (selected amount of bypass flow through the diverging discharge passage.

Figure 3:
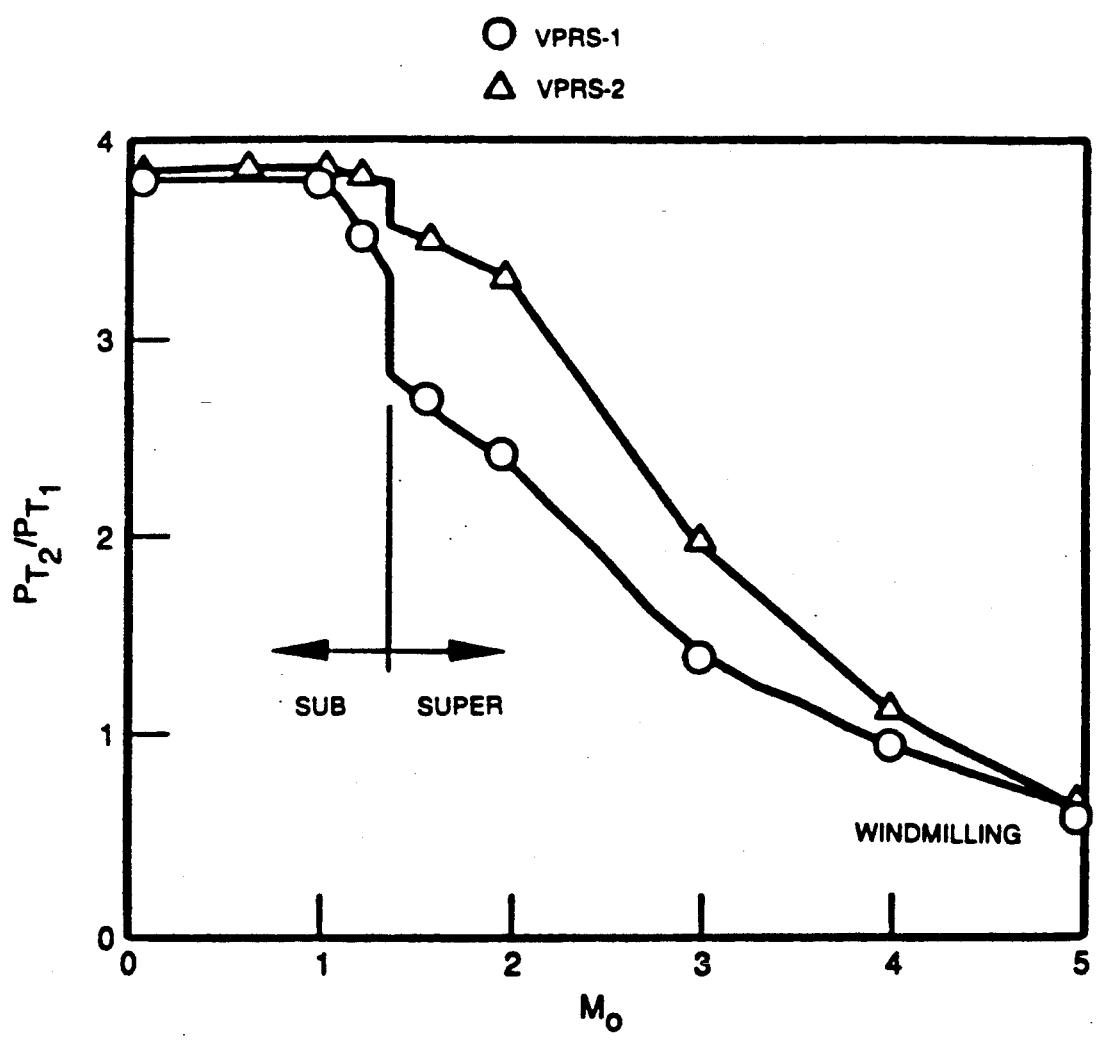
FIG. 3 is a graphic representation of the dependence of the total pressure ratio on the airplane Mach number for the engine of FIG. 1 but using two different fan configurations.

Two variable-pitch, split-rotor, split-stator fan configurations were designed for this application. These fans are identified below and in the drawing as VPRS-1 and VPRS-2. The first fan configuration had a pressure ratio of approximately 2.3 at the $M_o=2$ design condition. The second fan configuration had a pressure ratio of approximately 3.2 at the $M_o=2$ design condition. The operating total pressure ratio schedules for the two fans are shown in FIG. 3 of the drawing. These fan configurations were operated as subsonic inflow devices up to a flight speed of Mach 1.5. For transonic flight speeds between 1 and 1.5 a normal shock was forced upstream of the fan 19 to decelerate the flow to subsonic velocity. Above Mach 1.5, the fan is operated as a supersonic through-flow device. Both fans provided a total pressure ratio near 4 at subsonic conditions and both dropped off to a pressure ratio less than one at the Mach 5 condition. In between, the second fan configuration provided higher total pressure ratios. The first configuration provided about 75% of these values. The fan inlet and exit Mach numbers are given in FIG. 4. When operating as a subsonic fan below Mach 1.5, the fan exit Mach numbers are considerably less than the subsonic inlet Mach number. At low supersonic velocities (where the fan 19 does a lot of work) the supersonic fan 19 accelerates the flow to a higher Mach number, but at the high flight speeds, the exiting Mach number was less than the inlet Mach number, especially at the Mach 5 condition in which the fan was windmilling. At this windmilling condition, there was a total pressure loss across the fan 19; however, associated with this loss there was a small amount of supersonic diffusion required by the following compression region 15.

Figure 4:
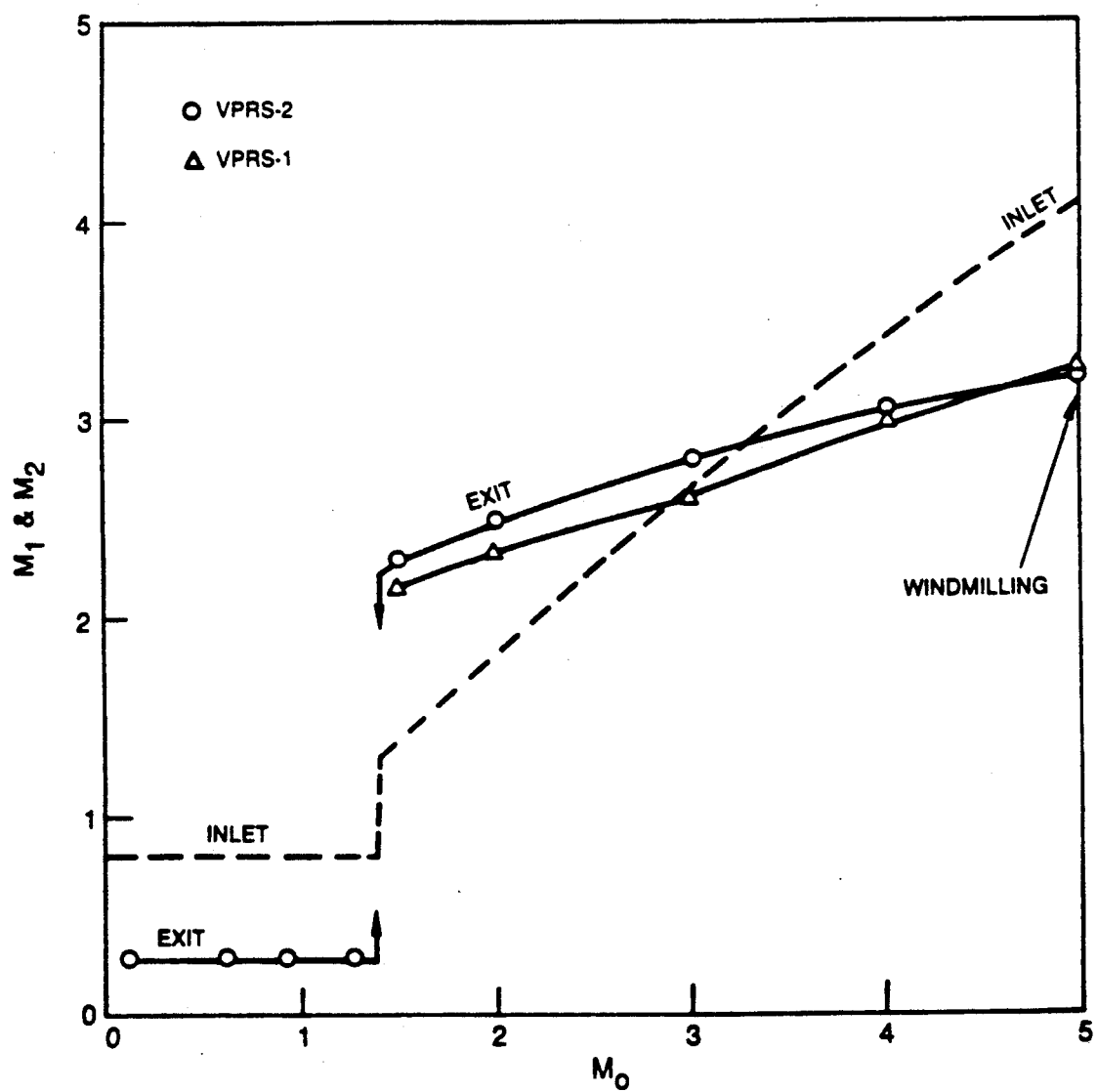
FIG. 4 is a graphic representation akin to that of FIG. 3 but showing the dependence of the fan inlet and outlet Mach numbers on the airplane Mach number.

Referring again to FIG. 1 of the drawing, the supersonic fan exit flow was diffused in the annular region 15 between the centerbody 12 and the variable cowl door 25 which provided a variable flow contraction. The throat Mach number of this annular diffuser 15 is also shown in FIG. 4. It is to be noted that, as the free-stream Mach number varies from 1.5 to 5.0, the fan exit Mach number only varies between 2.2 and 3.2, and the supersonic diffuser exit or throat Mach number varies between 1.3 and 1.8. During subsonic operation of the fan, the subsonic fan exit flow was accelerated to sonic conditions at the diffuser throat.

Figure 5:
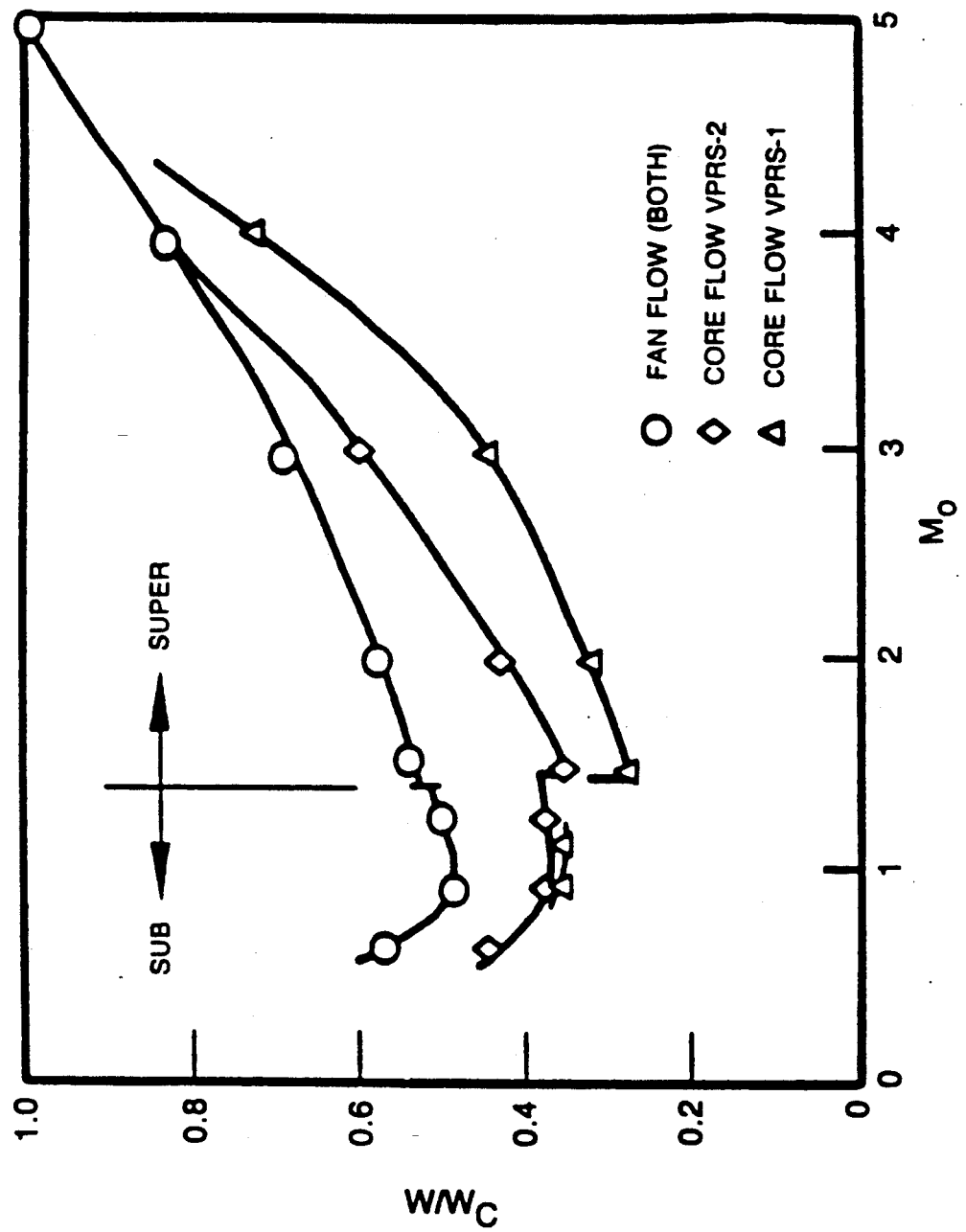
FIG. 5 is a graphic representation akin to that of FIG. 3 but showing the dependence of the ratio of core flow to the total flow on the airplane Mach number.

FIG. 5 of the drawing shows the airflow characteristics of these two engine configurations. The upper curve shows the flow which enters the inlet and is compressed by the fan 19. The lower two curves show the core flow which enters the main engine. The difference is the bypass flow, which is spilled through the discharge passage 28 outwardly delimited by the cowl doors 25. The second fan configuration provided greater compression of the flow, and thus more flow could pass through the fixed-throat area and enter the engine. There is a discontinuity in the core flow schedule at the transition Mach number. When operating in the subsonic mode, the cowl doors are positioned at an area which chokes the flow at the second throat; when transiting to the supersonic mode of operation the doors 25 are opened (quickly) spilling more flow, dropping the pressure and letting supersonic conditions be established through the fan.

Figure 6:
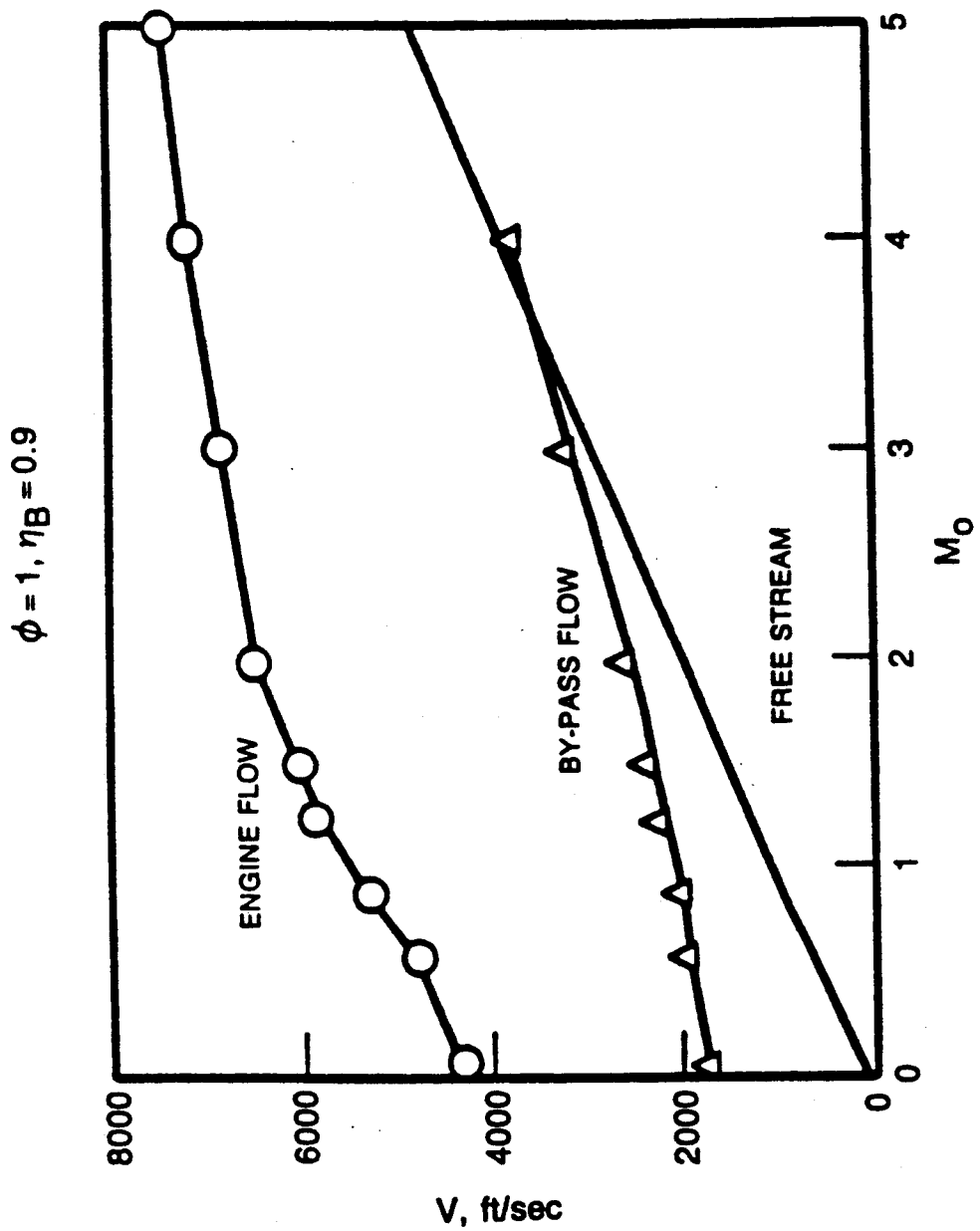
FIG. 6 is a graphic representation akin to that of FIG. 3 but showing the dependence of the exhaust flow velocity and of the free stream flow on the airplane Mach number.

The bypass flow is reaccelerated through the divergent oblique exhaust nozzle 28 formed between the fixed engine structure 27 and the variable cowl doors 25 (see FIG. 1). Because of the compression work which has been done on this flow, this flow can be accelerated to a higher velocity than the free-stream velocity, thereby providing thrust. The velocity of this bypass flow and the exhaust velocity of the main engine (core) flow is shown in FIG. 6. At subsonic flight conditions, the velocity of this bypass flow is approximately 2000 ft/sec, providing a significant amount of thrust; at higher speeds the thrust from the bypass flow decreases, becoming zero at a flight speed of approximately 3.6. Thus, spilling flow at flight speeds at Mach 4 and above would result in a spillage drag. It is to be noted that the airflow schedule (FIG. 5) for the second fan configuration (VPRS-2) does not spill at Mach 4 and above.

The main engine (core) flow, which is heated in the combustor 17 to high temperatures, has a much higher exhaust velocity, thereby providing significantly more thrust-per-lb of airflow. Thus, the engine total thrust is maximized by maximizing the flow through the main (core) engine; however, this does not necessarily maximize the fuel specific impulse.

Engine performance was calculated at nine flight conditions, from subsonic loiter speed to the Mach 5 cruise condition. The flight path used for these calculations is one in which the vehicle accelerates from 0 to 0.6 Mach at subsonic loiter, climbs to 20,000 ft up to 0.9 Mach, accelerates through the transonic region at constant altitude to Mach 1.5, then climbs while it accelerates to Mach 5 maintaining a 1500 psi dynamic pressure.

Figure 7:
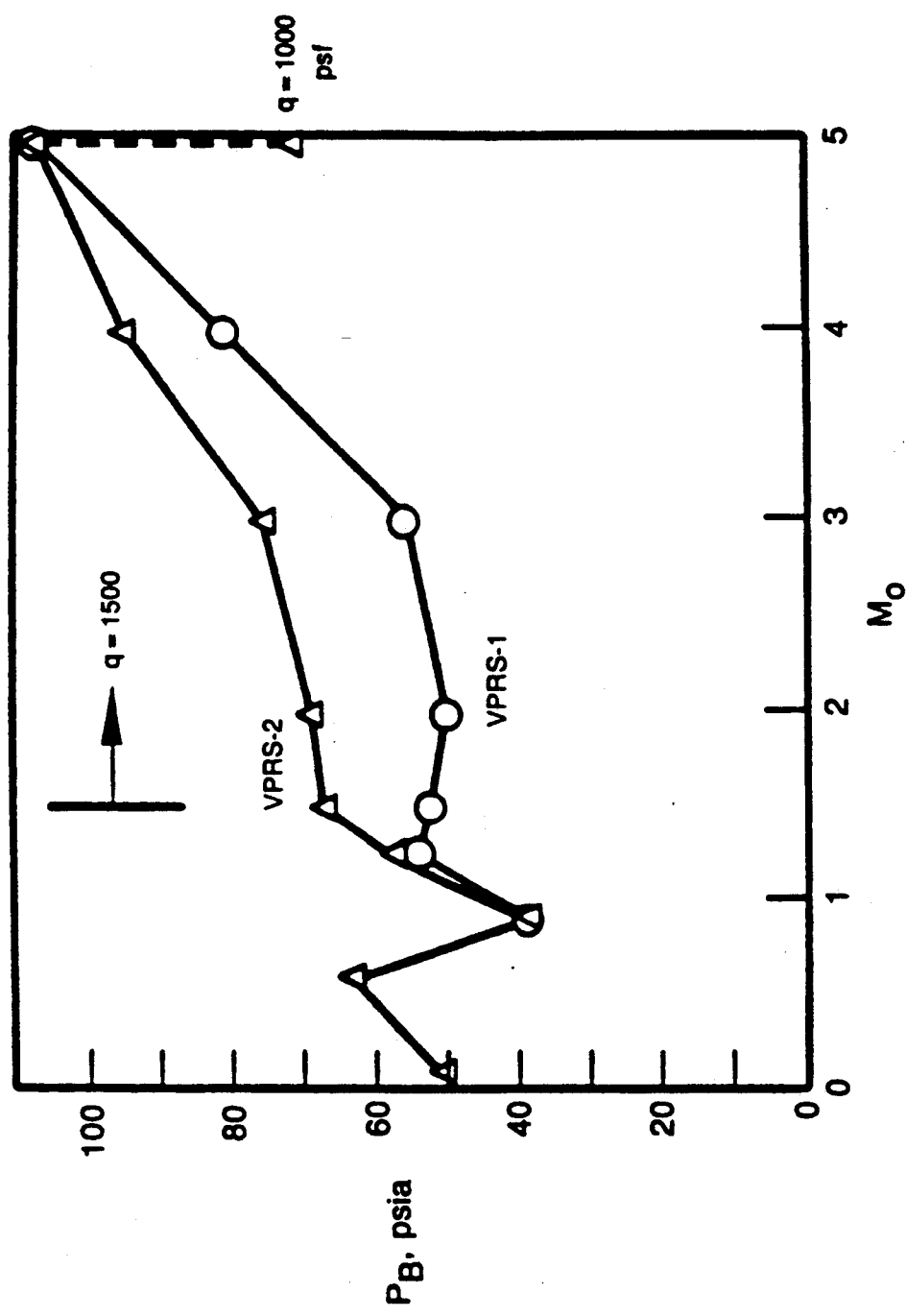
FIG. 7 is a graphic representation akin to that of FIG. 3 but showing the dependence of the burner pressure on the airplane Mach number.

The thrust of these two engine configurations is presented in FIG. 7. The supersonic through-flow fan air turbo-rocket engine 10 having a capture area of 25 ft$^2$ provides approximately 70,000 lb of take-off thrust, 50,000–70,000 lb of thrust through the transonic region, and a thrust in excess of 50,000 lb over the entire supersonic acceleration climb path. The second engine using the VPRS-2 fan provides approximately 25% greater thrust along this supersonic acceleration path than the first engine using the VPRS-1 fan.

Figure 8:
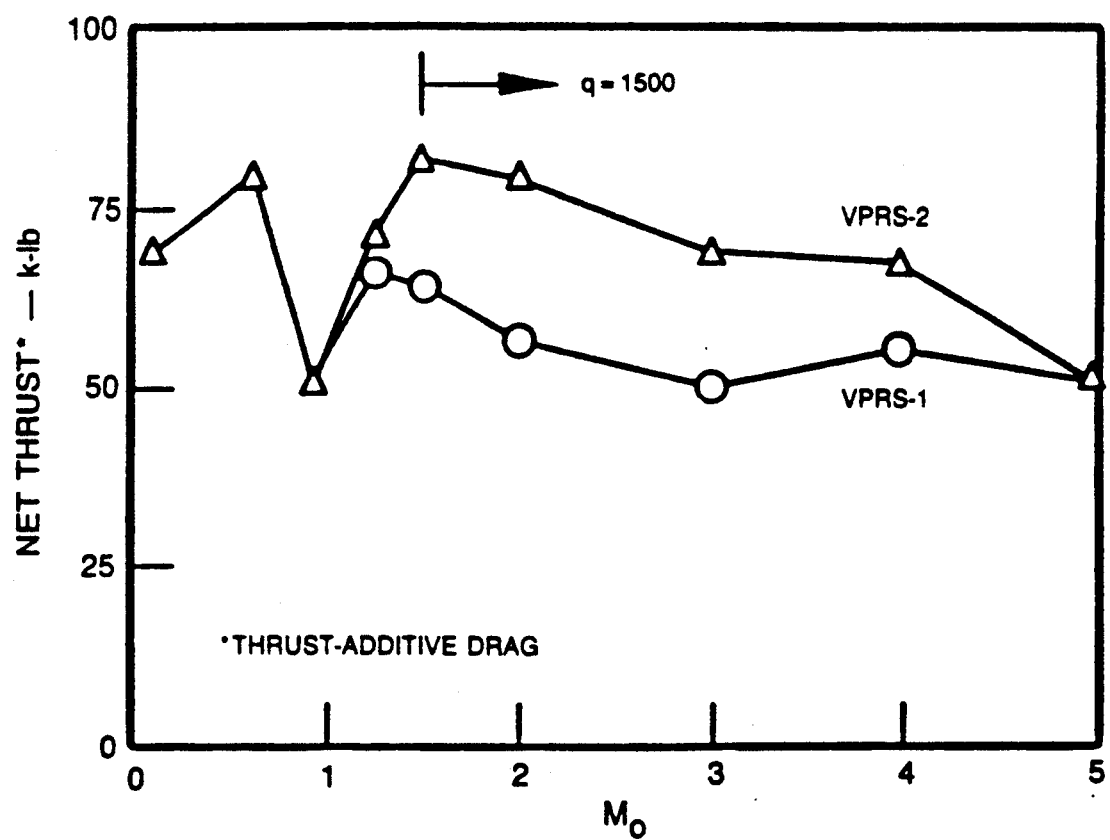
FIG. 8 is a graphic representation akin to that of FIG. 3 but showing the dependence of the net thrust on the airplane Mach number.
Figure 9:
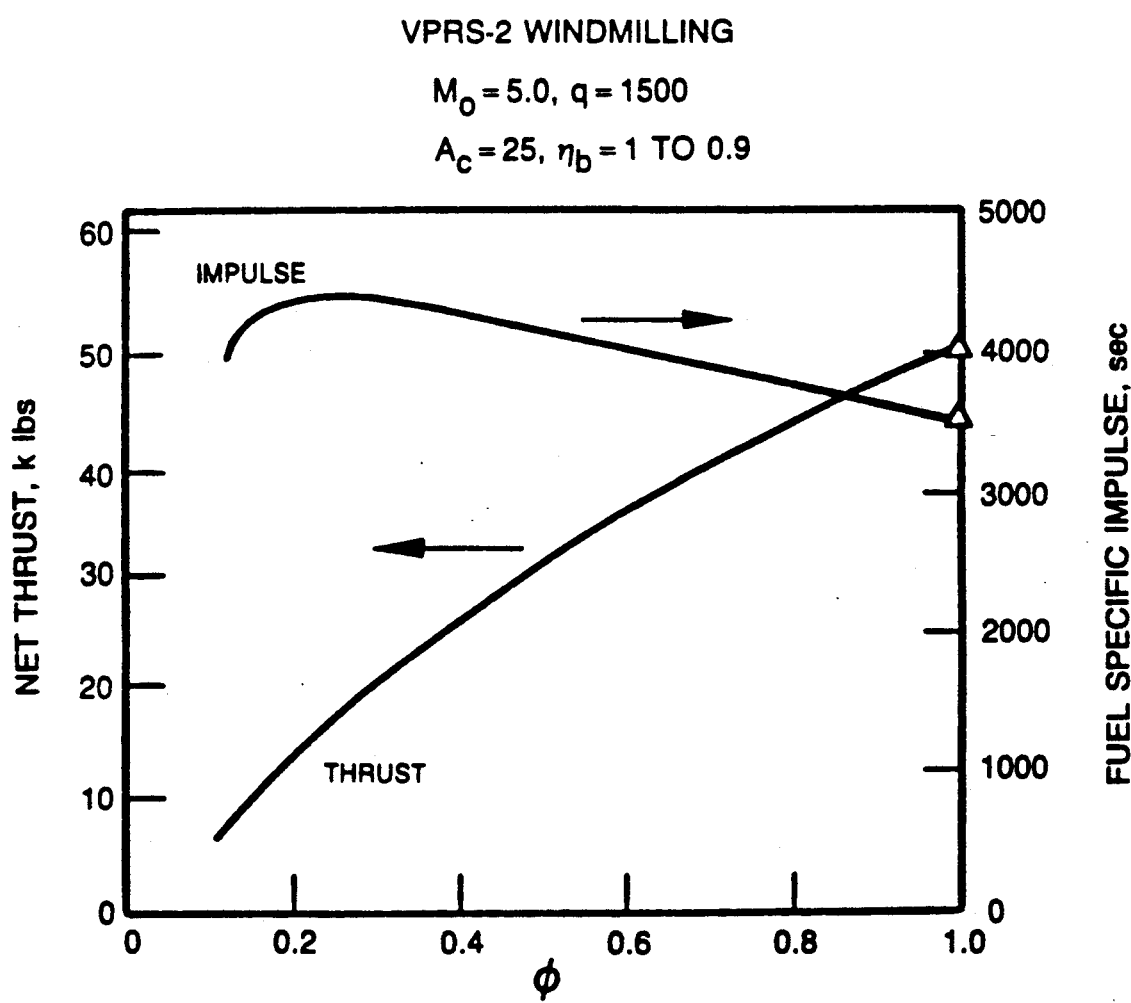
FIG. 9 is a graphic representation showing the dependence of the net thrust and of the net fuel specific impulse when using one of the fan configurations in the engine of FIG. 1 on the fuel stoichiometry during the windmilling operation of the fan.

The fuel specific impulses of these engines are presented in FIG. 8. The impulses are comparable with the second engine being slightly better over the low end of the speed range. The level of specific impulse (2000–2500 sec) which is obtained by these supersonic through-flow fan air turbo-rocket engines 10 at low speeds is considerably less than would be obtained from a conventional turbofan because only 40% of the propellant is combustible H fuel, the remaining 60% is $H_2O$. However, at Mach 5, where the engine is operating like a ramjet, all the propellant is hydrogen and the impulse obtained is 3500 sec. Furthermore, the impulse is increased when the engine is throttled to lower power (lower $\phi$) settings as shown in FIG. 9. Operation at half the maximum thrust, at $\phi=0.4$, would increase the fuel specific impulse to about 4400 sec.

The results presented in these last three Figures show that the engine 10 using the higher pressure ratio fan VPRS-2 provides greater thrust and impulse over the lower speed portion of the flight trajectory, and comparable performance to the engine 10 using the VPRS-1 fan at the Mach 5 cruise condition. Therefore, the engine configuration with the VPRS-2 fan was selected as the baseline supersonic through-flow fan air turbo-rocket engine to be compared with the conventional air-turbo-rocket ramjet engine.

The performance of the supersonic through-flow air turbo-rocket engine 10 of the present invention was compared with that of a conventional air turbo rocket ramjet engine. The conventional air turbo-rocket-ramjet engine used for the following comparison consists of an air turbo-rocket engine and a ramjet in an over-/under configuration. The air-turbo-rocket has a two stage conventional fan powered by a seven stage turbine. An oxygen/hydrogen burner provides fuel-rich flow to the turbine. This fuel rich flow is then mixed with the fan discharge flow and burned in an afterburner. This air turbo-rocket engine is operating from Mach 0 to approximately Mach 3.5. The ramjet burner is turned on at Mach 1.2. At flight Mach numbers above 3.5, all the inlet airflow passes through the ramjet.

The supersonic through-flow fan air turbo-rocket engine 10 of the present invention was sized, like the conventional engine, to provide 72,000 lbs installed thrust at the Mach 3-50,000 ft flight condition. Both engines have approximately the same inlet and exit areas; however, the conventional over/under air turbo-rocket-ramjet engine is more than twice as long and 40% heavier than the supersonic through-flow fan air turbo-rocket engine 10 of the present invention.

Figure 10:
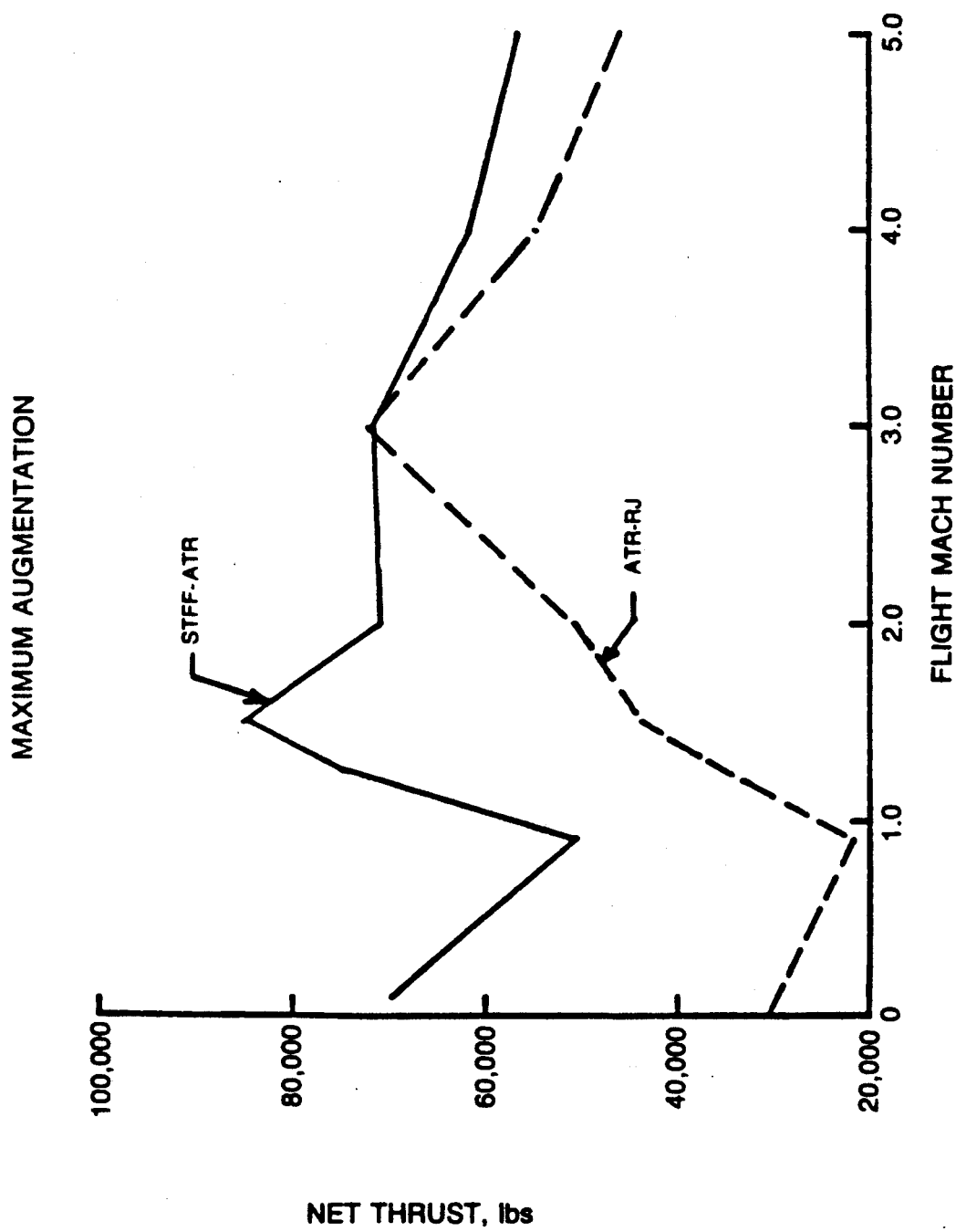
FIG. 10 is a graphic representation of the dependence of the net thrust of the engine of FIG. 1 using the one fan configuration and of a conventional engine on the airplane Mach number.

FIG. 10 presents the maximum augmented net thrust along the climb path shown for the supersonic through-flow fan air turbo-rocket engine 10 and for the air turbo-rocket-ramjet engine. The engines were sized to provide the same thrust at Mach 3 flight conditions; for these engine sizes, the supersonic through-flow fan air turbo-rocket engine 10 has twice as much thrust as the conventional air turbo-rocket-ramjet engine at Mach numbers below 1.5 because it flows about twice as much airflow; above Mach 4.0, both engines are basically operating as ramjets and the supersonic through-flow fan air turbo-rocket engine 10 provides slightly more thrust at Mach 5 because the inlet has no boundary layer bleed, and all the capture flow goes through the burner.

Figure 11:
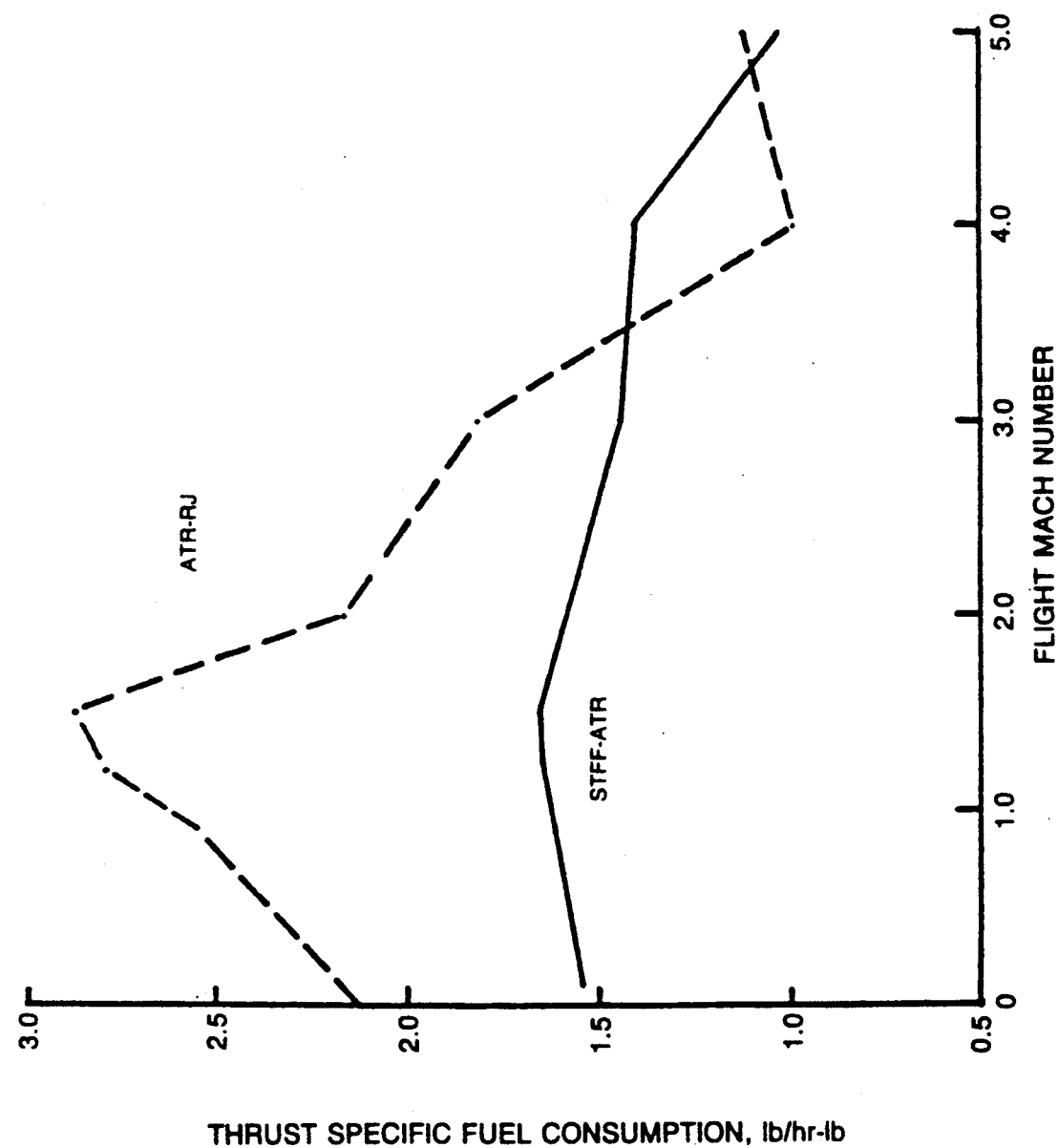
FIG. 11 is a graphic representation akin to that of FIG. 10 but showing the dependence of the thrust specific thrust consumption on the airplane Mach number.

FIG. 11 compares the maximum augmented thrust specific fuel consumption rates for the two types of engines. This thrust specific fuel consumption is the ratio of the total propellant (hydrogen plus oxygen) flow rate divided by the total net thrust. The supersonic through-flow fan air turbo-rocket engine 10 has a lower thrust specific fuel consumption at the low Mach numbers because of its lower inlet drag and because the bypass air provides thrust. The higher fan pressure of the supersonic through-flow fan air turbo-rocket engine 10 also increases the specific thrust of the core flow, which reduces fuel consumption.

At Mach 5, both types of engines are operating as ramjets, with a stoichiometric fuel/air ratio, and both engine types have approximately the same thrust specific fuel consumption.

Studies were conducted to determine the take-off gross weight of a Mach 5 cruise vehicle system having a total range of 4000 nautical miles. The mission evaluated is comprised of a takeoff and a climb/acceleration to the Mach 5.0 speed at 83,000 ft cruise condition. A 5000 lb payload is carried throughout the 4000 nautical mile range.

For this study, the supersonic through-flow fan air turbo-rocket engine 10 and the air turbo-rocket-ramjet engine were sized to provide the same take-off thrust to take-off gross weight ratio of 0.45. Since the supersonic through-flow fan air turbo-rocket engine 10 has approximately twice the take-off thrust (for the same size engine) of the conventional over/under air turbo-rocket-ramjet, the system employing the supersonic through-flow fan air turbo-rocket engine 10 has a much smaller and lighter propulsion system. This thrust/weight advantage resulted in a significantly lower aircraft system weight. The supersonic through-flow fan air turbo-rocket powered aircraft had a take-off gross weight of approximately 70,000 lb compared to 180,000 lb for the conventional air turbo-rocket-ramjet powered aircraft.

This take-off gross weight advantage is mainly due to the lighter propulsion system, but the lower fuel consumption rate during the climb/acceleration and cruise contributed to this difference.

While the present invention has been illustrated and described as embodied in a particular construction of a jet engine employing a particular type of a supersonic fan, it will be appreciated that the present invention is not limited to this particular example; rather, the scope of protection of the present invention is to be determined solely from the attached claims.

I claim:

1. A jet engine capable of being used to power an aircraft throughout a range of speeds from subsonic to high supersonic, comprising means for bounding an internal passage centered on an axis and including, in succession as considered in he direction of axial flow of incoming air into and through said passage, a fixed-area air inlet section, a diverging passage section, a mixing section, a combustion section, and an outlet section;

fan means situated ins aid air inlet section and including a rotor mounted in said bounding means for rotation about said axis and including a plurality of circumferentially spaced rotor blade members;

means for selectively rotating said rotor about said axis with attendant impelling action of said rotor blade members on the air flowing therebetween; and means for selectively discharging air from a region of said passage situated between said air inlet section and said diverging passage section to the exterior of said bounding means, both at subsonic and supersonic speeds of the aircraft, when the amount of incoming air passing through said fixed-area inlet section exceeds that required in said combustion section.

2. The jet engine as defined in claim 1, wherein said bounding means includes a jet engine housing extending externally around said passage and including a main body; and wherein said discharging means includes at least one flap mounted on said main body for movement relative thereto between a first end position in which it externally bounds at least a portion of said region and thus constitutes a part of said bounding means, and a second end position in which it externally delimits a discharge passage which has an inlet end communicating with said region and an outlet end spaced ins aid direction from said inlet end and communicating with the exterior of said housing, and which is internally delimited by said main body, and means for selectively movign said flap between said end positions thereof.

3. The jet engine as defined in claim 2, wherein said flap is mounted on said main body at said inlet end of said discharge passage for pivoting about a pivot axis extending transversely with respect to said axis of said passage; and wherein said moving means includes means for pivoting said flap between said end positions thereof.

4. The jet engine as defined in claim 3, wherein said flap and said main body have such configurations that said discharge passage diverges from said inlet end to said outlet end thereof.

5. The jet engine as defined in claim 1, and further comprising means for varying the cross-sectional area of said outlet means.

6. The jet engine as defined in claim 1, wherein each of said rotor blade members includes at least one rotor blade element with an adjustable pitch.

7. The jet engine as defined in claim 1, wherein said fan means further includes a stator situated in said inlet section downstream of said rotor as considered in said direction and including a plurality of circumferentially distributed stator blade members.

8. The jet engine as defined in claim 7, wherein each of said stator blade members includes at least one stator blade element with an adjustable pitch.

9. The jet engine as defined in claim 8, wherein each of said rotor blade members includes at least one rotor blade element with an adjustable pitch.

10. The jet engine as defined in claim 1, wherein said selectively rotating means includes at least one gas generator, means for supplying fuel and oxygen to said gas generator, a gas turbine including a turbine rotor driven in rotary motion by combustion gases resulting from combustion of the fuel with the oxygen supplied to said gas generator, and means for transmitting the rotary motion of said turbine rotor to said rotor blade support means.

11. The jet engine as defined in claim 10, wherein said turbine has an outlet which opens into said mixing section of said passage.

12. The jet engine as defined in claim 11, and further comprising means for adjusting the fuel/oxygen ratio supplied by said supplying means in dependence on the actual velocity of the incoming air axial flow all the way to a complete cutoff of the supply of at least oxygen by said supplying means to said gas generator when said actual velocity exceeds a predetermined supersonic velocity.

* * * * *

UNITED STATES PATENT AND TRADEMARK OFFICE
CERTIFICATE OF CORRECTION

PATENT NO. : 5,074,118
DATED : December 24, 1991
INVENTOR(S) : Charles E. Kepler It is certified that error appears in the above-indentified patent and that said Letters Patent is hereby corrected as shown below:

Column 8, Claim 1, line 19, "he" should be --the--.

Column 8, Claim 2, line 49, "ins aid" should be --in said--.

Signed and Sealed this

Twenty-eighth Day of September, 1993

Attest:

BRUCE LEHMAN

Attesting Officer

Commissioner of Patents and Trademarks